(12) United States Patent
Jun et al.

(10) Patent No.: US 9,188,450 B2
(45) Date of Patent: Nov. 17, 2015

(54) METHOD FOR PROVIDING AN OPERATING DEVICE IN A VEHICLE, AND OPERATING DEVICE FOR A VEHICLE

(75) Inventors: Mi-Ran Jun, Berlin (DE); Tobias Budzynski, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/342,298

(22) PCT Filed: Aug. 28, 2012

(86) PCT No.: PCT/EP2012/003608
§ 371 (c)(1),
(2), (4) Date: Jun. 6, 2014

(87) PCT Pub. No.: WO2013/029778
PCT Pub. Date: Mar. 7, 2013

(65) Prior Publication Data
US 2014/0303890 A1 Oct. 9, 2014

(30) Foreign Application Priority Data

Sep. 3, 2011 (DE) .......................... 10 2011 112 442

(51) Int. Cl.
*G08G 1/0969* (2006.01)
*G01C 21/26* (2006.01)
(Continued)

(52) U.S. Cl.
CPC .............. *G01C 21/26* (2013.01); *B60K 37/06* (2013.01); *B60K 2350/1028* (2013.01); *G01C 21/32* (2013.01); *G04G 9/0076* (2013.01)

(58) Field of Classification Search
USPC .......................... 701/400–541; 340/988–996; 345/156–184
See application file for complete search history.

(56) References Cited

U.S. PATENT DOCUMENTS 3,940,920 A 3/1976 Nakamura et al.
5,802,492 A * 9/1998 DeLorme ........... G01C 21/3476
340/990

(Continued)

FOREIGN PATENT DOCUMENTS

DE 19941956 A1 3/2001
DE 102006032118 A1 1/2008

(Continued)

OTHER PUBLICATIONS

Search Report for German Patent Application No. 10 2011 112 442.3; Dec. 5, 2011.

(Continued)

*Primary Examiner* — Rami Khatib
*Assistant Examiner* — Timothy Nesley
(74) *Attorney, Agent, or Firm* — Barnes & Thornburg LLP

(57) ABSTRACT

A method for providing an operating device in a vehicle, wherein graphic data are generated by a control device, targeting a display area such that a graphic object showing at least part of the earth's surface is displayed, that the illustration of the displayed part of the earth's surface is subdivided into geographic areas in different time zones, and that the position of an actuation object in front of or on the display area is captured. Depending on the captured position of the actuation object relative to the displayed geographic areas in different time zones in the depiction of the graphic object, a geographic area located in one single time zone is selected and is displayed in bold formatting, and the time zone of the selected geographic area is dedicated to at least one timer of the vehicle. Also disclosed is an operating device for carrying out the method.

8 Claims, 3 Drawing Sheets

(51) Int. Cl.
 *B60K 37/06* (2006.01)
 *G01C 21/32* (2006.01)
 *G04G 9/00* (2006.01)

(56) References Cited

U.S. PATENT DOCUMENTS

| | | | |
|---|---|---|---|
| 5,907,523 A | 5/1999 | Richins | |
| 7,194,356 B2* | 3/2007 | Sano | G01C 21/3461 |
| | | | 701/428 |
| 7,702,454 B2* | 4/2010 | Nesbitt | G01C 21/367 |
| | | | 340/995.1 |
| 8,583,638 B2* | 11/2013 | Donelli | G06F 1/14 |
| | | | 707/724 |
| 8,957,921 B2* | 2/2015 | Bae | G09B 29/106 |
| | | | 345/173 |
| 2001/0035880 A1* | 11/2001 | Musatov | G06F 3/04886 |
| | | | 715/764 |
| 2005/0165543 A1* | 7/2005 | Yokota | G01C 21/3679 |
| | | | 701/465 |
| 2009/0228793 A1 | 9/2009 | Noh et al. | |
| 2011/0055244 A1 | 3/2011 | Donelli | |
| 2011/0145073 A1 | 6/2011 | Richman et al. | |
| 2013/0144522 A1* | 6/2013 | Irie | G01C 21/3667 |
| | | | 701/430 |

FOREIGN PATENT DOCUMENTS

| | | |
|---|---|---|
| JP | 2005121425 A | 5/2005 |
| KR | 1020090096831 A | 9/2009 |

OTHER PUBLICATIONS

Search Report for International Patent Application No. PCT/EP2012/003608; Feb. 13, 2013.

Office Action for Korean Patent Application No. 10-2014-7008809; Mar. 17, 2015.

* cited by examiner

METHOD FOR PROVIDING AN OPERATING DEVICE IN A VEHICLE, AND OPERATING DEVICE FOR A VEHICLE

PRIORITY CLAIM

This patent application is a U.S. National Phase of International Patent Application No. PCT/EP2012/003608, filed 28 Aug. 2012, which claims priority to German Patent Application No. 10 2011 112 442.3, filed 3 Sep. 2011, the disclosures of which are incorporated herein by reference in their entirety.

SUMMARY

The present disclosure relates to a method for providing an operating device in a vehicle. In the method, a control device generates graphics data which control a display area in such a manner that a graphical object containing a presentation of at least part of the Earth's surface is displayed. In this case, the presentation of the displayed part of the Earth's surface is subdivided into geographical areas in different time zones. The present disclosure also relates to an operating device for a vehicle, having a display area for graphically presenting information in the vehicle. The operating device also comprises a control device which can be used to generate graphics data for a graphical object which can be presented on the display area and displays a presentation of at least part of the Earth's surface. In this case too, the presentation of the displayed part of the Earth's surface is subdivided into geographical areas in different time zones. The operating device also comprises an input device which is coupled to the control device and can be used to detect the position of an actuating object in front of or on the display area.

BRIEF DESCRIPTION OF THE DRAWINGS

The present disclosure is now explained using disclosed embodiment with reference to the drawings.

DETAILED DESCRIPTION OF THE DISCLOSED EMBODIMENTS

Figure 1:
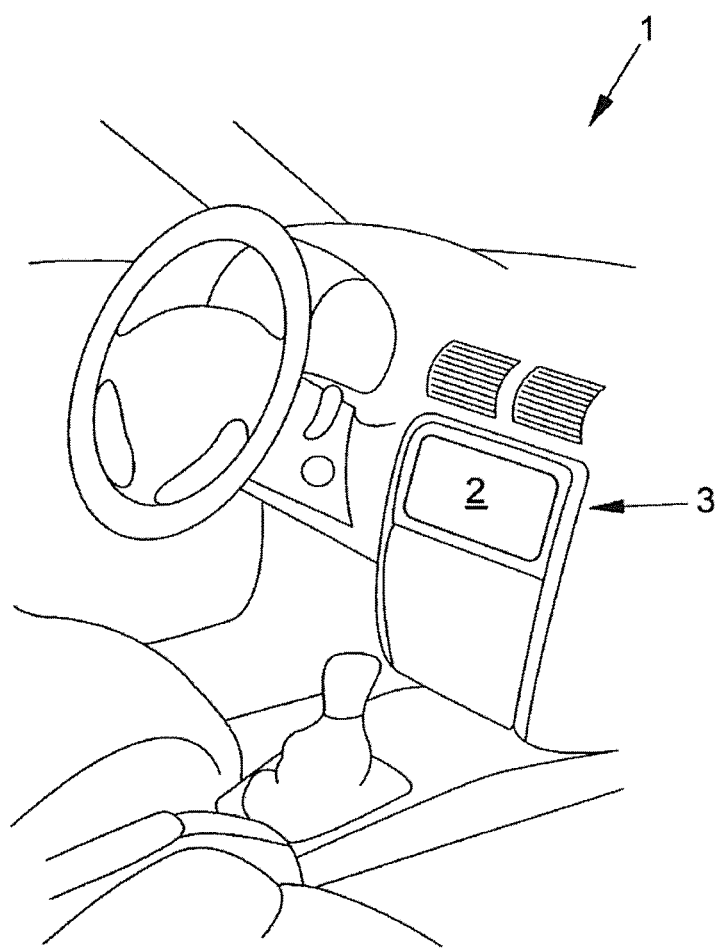
FIG. 1 shows a disclosed embodiment of the vehicle in which a disclosed embodiment of the operating device is arranged.

There are very special requirements for displaying information in a vehicle. In the vehicle, information is assimilated, inter alia, by the driver. The information should therefore be presented in the vehicle in such a manner that the assimilation of the information by the driver does not result in distraction while traveling. The information presented should therefore be able to be intuitively and quickly understood by the driver, with the result that he must only very briefly avert his gaze from what is happening on the road to assimilate the information. If the operation of the vehicle devices is assisted or controlled by a display, the display should be effected in such a manner that the driver only needs to look at the display very briefly to carry out the operation.

Illustrative embodiments provide a method and an operating device of the type mentioned at the outset which can be used to quickly and intuitively set a time zone for the user.

In the method, a control device generates graphics data which control a display area in such a manner that a graphical object containing a presentation of at least part of the Earth's surface is displayed. For example, it is possible to present a so-called world map on which the outlines of the continents and possibly the countries are symbolically presented. The presentation of the displayed part of the Earth's surface is subdivided into geographical areas in different time zones. A time zone is a region of the Earth's surface which has a consistent time and a consistent date. In the method, the position of an actuating object in front of or on the display area is also detected. The actuating object is, in particular, a finger or the fingertip of a user, for example the driver of the vehicle. Depending on the detected position of the actuating object relative to the displayed geographical areas in different time zones in the presentation of the graphical object, a geographical area which belongs to a single time zone is selected and displayed in highlighted form. Furthermore, the time zone of the selected geographical area is associated with at least one timer of the vehicle.

In the method, the user can advantageously associate a particular time zone with a timer of the vehicle in a very simple, intuitive and fast manner. He is assisted by the graphical presentation on the display area when selecting the time zone.

The selected geographical area can be presented in highlighted form, for example, using a presentation in a different color, a different saturation of the presentation of the area or in any other desired manner in which the selected area stands out from the other geographical areas in some manner for the viewer.

According to at least one disclosed embodiment of the method, the control device generates graphics data which control the display area in such a manner that further graphical objects are displayed. For example, a graphical object can name some of the countries and/or cities and/or regions included in the selected geographical area. A further geographical object displays, for example, the current time in the selected geographical area. Yet another graphical object displays, for example, the relative time difference between the selected geographical area and an area in a particular time zone. For example, the time difference relative to the so-called Greenwich Mean Time (GMT) is displayed. In this disclosed embodiment of the method, telephone number recognition devices are coupled, for example. These devices are required, for example, when making telephone calls in a vehicle. The exact time of the interlocutor is presented to the viewer. The presentation of the further graphical objects has the advantage that the viewer can be guided in an even simpler and more intuitive manner when selecting a particular time zone.

According to another disclosed embodiment of the method, a geographical area is selected and presented in highlighted form if the actuating object touches a touch-sensitive surface of the display area in the region in which the area is displayed. The contents of at least one further graphical object are then changed in such a manner that the current time and/or the relative time difference of the selected geographical area is/are displayed, but the selected geographical area is not yet associated with the timer as long as the actuating object (5) is touching the touch-sensitive surface (6) of the display area (2). In this case, the selected geographical area is associated with the timer only when the touching of the actuating object is removed from the touch-sensitive surface of the display area. In this disclosed embodiment of the method, a so-called touchscreen is therefore used as the input device. Touching the touchscreen in the region in which an area in a particular time zone is displayed makes it possible for the user to highlight this area in his presentation. Furthermore, in this case, the further graphical objects described above may be adapted to the selected geographical area. For example, countries, cities or regions in this area are named, the current time in this area is displayed and the relative time difference is presented. However, as long as the user touches the touchscreen, the selected geographical area is not yet associated with the timer, that is to say the timer is not yet set to the time zone of this area. The timer is set to the time zone of the selected area only when the user removes the actuating object, that is to say his fingertip for example, from the touchscreen. This is because the user's operating process for setting the timer is ended only in this case. While the user is touching the touchscreen, he can still move the actuating object on the touchscreen and in this manner can have the information relating to the further graphical objects for different time zones displayed. As a result, the user is advantageously assisted with the selection of the time zone to be set.

The operating device is designed so that, depending on the detected position of the actuating object relative to the displayed geographical areas in different time zones, the control device can generate graphics data which control the display area in such a manner that a selected geographical area which belongs to a single time zone is displayed in highlighted form, and in that the control device can generate a control signal for a timer of the vehicle, which control signal is associated with the time zone of the selected geographical area.

The operating device is designed, in particular, to carry out the method according to the disclosed embodiments described hereinabove. It, therefore, has the same advantages as the disclosed method.

Illustrative embodiments also relate to a vehicle having the operating device described hereinabove.

FIG. 1 shows a disclosed embodiment of the vehicle 1. An operating device 3 having a display area 2 is arranged in the center console of the vehicle 1.

Figure 2:
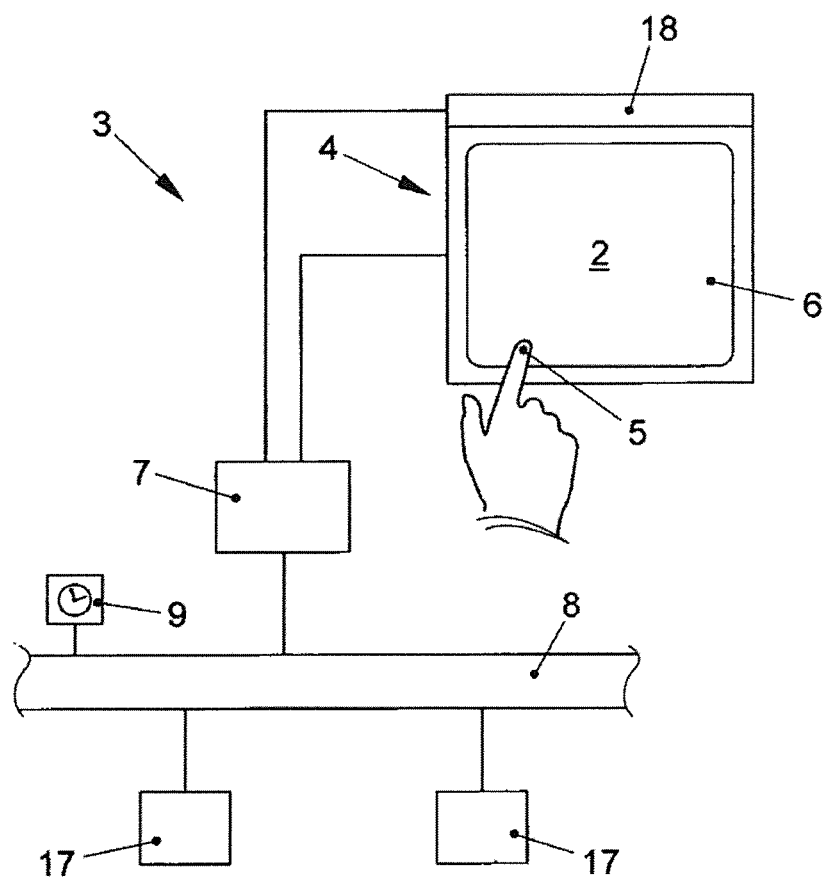
FIG. 2 shows the structure of a disclosed embodiment of the operating device and its coupling to other devices of the vehicle.

The structure of the disclosed embodiment of the operating device 3 is explained in detail below with reference to FIG. 2:

The operating device 3 comprises a display device 4 having a display area 2. The display area 2 can be provided by a display, in particular a liquid crystal display, of any desired design.

A touch-sensitive surface 6 is formed on the display area 2, with the result that a so-called touchscreen is provided in a manner known per se. The touch-sensitive surface 6 provides an input device in this case. The user can touch the touch-sensitive surface 6 using an actuating object, for example his fingertip 5. The touch position is detected and input signals are generated in conjunction with the presented display contents.

The display device 4 is coupled to a control device 7. On the one hand, the control device 7 generates graphics data which are transmitted to the display device 4 and are used to generate any desired display on the display area 2. On the other hand, data relating to the positions at which an actuating object, such as the user's fingertip 5, touches the touch-sensitive surface 6 are transmitted to the control device 7.

Finally, a proximity sensor 18 is arranged in the display device 4 and is also coupled to the control device 7. The proximity sensor 18 can be used to detect when an actuating object 5 approaches the touch-sensitive surface 6. For example, a detection space is defined in front of the display area 2 or the touch-sensitive surface 6. Entry of an actuating object 5 into this detection space is detected by the proximity sensor 18, whereupon the latter transmits a corresponding signal to the control device 7.

The control device 7 is also coupled to further devices 17 of the vehicle 1 via a data bus 8 of the vehicle 1. The control device 7 is also coupled to a timer 9 of the vehicle 1 via the data bus 8. This timer 9 may be a central clock of the vehicle 1 which provides time signals for displaying the time. Furthermore, however, the timer 9 may also provide the further devices 17 of the vehicle 1 with time signals for further processing.

The control device 7 is designed in such a manner that a user can set the timer 9 to a particular time zone. For this purpose, the user is assisted by the display on the display area 2 generated by the control device 7, as explained below with reference to FIGS. 3 and 4 using a disclosed embodiment of the method.

Figure 3:
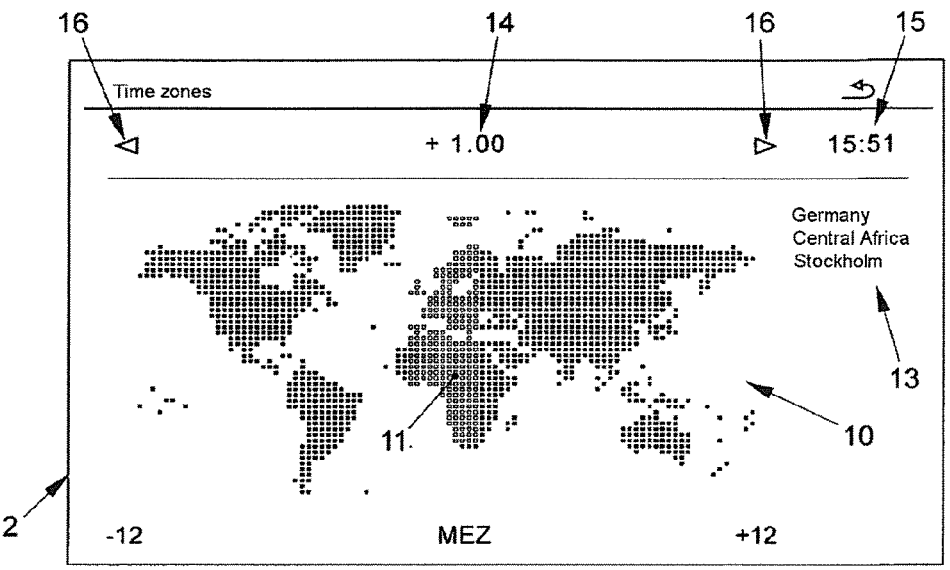
FIG. 3 shows a presentation on the display area of the operating device, which presentation is generated by a disclosed embodiment of the method.

The control device 7 generates graphics data which control the display area 2 in such a manner that a graphical object 10 containing a two-dimensional planar presentation of the Earth's surface is displayed. As shown in FIG. 3, the graphical object 10 displays a world map. The parts of the Earth's surface which are covered by the continents are schematically highlighted by dark dots. The graphical object 10 is subdivided into different areas 11, 12. The areas 11, 12 correspond to geographical areas of the Earth's surface which are associated with a single time zone.

One of these geographical areas 11, 12 can be selected. In the initial state of the method, as reproduced in FIG. 3, the selected area is the geographical area 11, the time zone of which is currently set in the timer 9. The selected geographical area 11 is presented inside the other areas in a form highlighted in any desired manner. In the example shown in FIG. 3, the dots of the selected geographical area 11 are presented in a lighter color than the dots which represent the continents of the other areas.

In addition to the graphical object 10, the display area 2 also displays further graphical objects: a graphical object 13 is displayed on the right beside the graphical object 10, which graphical object 13 names some of the countries, cities and/or regions included in the selected geographical area 11. In the display reproduced in FIG. 3, the user can quickly discern from the graphical object 13 that Germany, central Africa and Stockholm are included in the selected geographical area 11.

A graphical object 14 which displays the relative time difference between the selected geographical area 11 and Greenwich Mean Time is also displayed.

Finally, the current time in the selected geographical area 11 is displayed as yet another graphical object 15.

Figure 4:
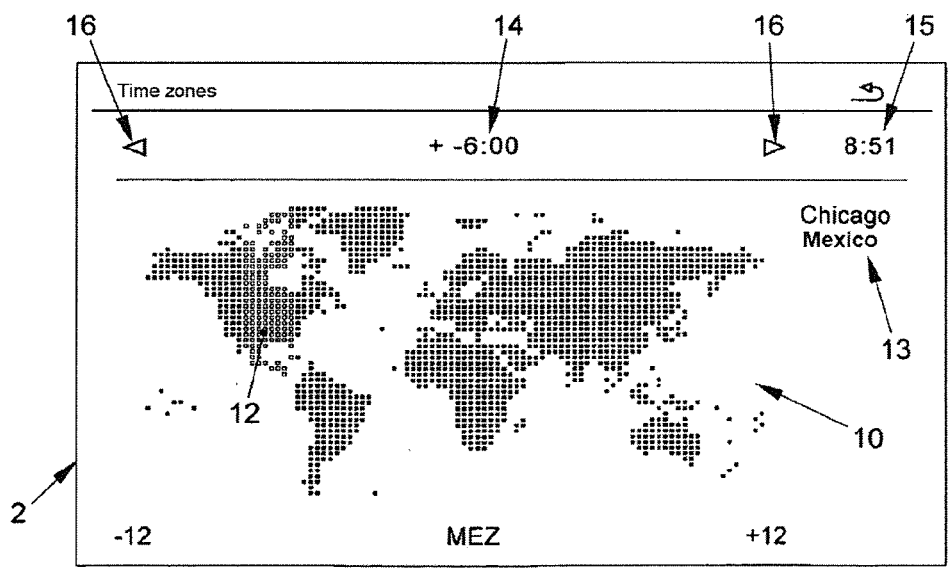
FIG. 4 shows another presentation on the display area of the operating device, which presentation is generated by a disclosed embodiment of the method.

The user can now change the setting of the timer 9 as follows:

The user approaches the display area 2 using his fingertip 5. If the fingertip 5 enters the detection space, this is detected by the proximity sensor 18. The latter transmits a corresponding signal to the control device 7. The control device 7 then changes the presentation on the display area 2 from a display mode to an operating mode in which buttons which can be actuated are displayed. If the user now taps one of the buttons 16, the selected geographical area 11 is moved by one time zone to the east or west, that is to say by one position to the left or right in the presentation according to FIG. 3. The user can select the desired time zone by repeatedly tapping the buttons 16. After an interval of time has expired (a so-called timeout), the time zone of the selected geographical area 12 is associated with the timer 9. For this purpose, the control device 7 transmits a corresponding signal to the timer 9 via the data bus 8. FIG. 4 shows how the display on the display area 2 has changed if the user has selected the area 12, which includes Chicago and Mexico, as the selected geographical area. The presentation of the graphical object 10 has accordingly been adapted. The geographical area 12 is now presented in highlighted form. Furthermore, the contents of the graphical objects 13 to 15 are also accordingly adapted.

However, the user can also select the desired time zone in another manner. He can use his fingertip 5 to touch the presented Earth's surface of the graphical object 10 in a particular geographical area. The geographical area in which the user's fingertip 5 touches the touch-sensitive surface 6 on the display area 2 is then selected and presented in highlighted form. At the same time, the contents of the further graphical objects 13 to 15 are also adapted in accordance with the selected geographical area, that is to say the relative time difference and the current time in this time zone are displayed, in particular. However, the time setting is not yet changed at this time. The user can now move his fingertip 5 over the graphical object 10 and in this manner can select other geographical areas, whereupon the contents of the graphical objects 13 to 15 are respectively adapted in accordance with the selected geographical area.

If, for example, the user has moved his fingertip 5 to the geographical area 12, as shown in FIG. 4, and then removes his fingertip 5 from the touch-sensitive surface 6 on the display area 2, this is detected by the control device 7 and is interpreted as the end of the operating process. The control device 7 then generates a control signal containing information relating to the selected time zone of the selected geographical area 12 and transmits this control signal to the timer 9 via the data bus 8. The timer 9 is then set to the selected time zone.

With the increase in electronic devices in the vehicle, it was necessary to present a larger amount of information in the vehicle. In addition to a multifunction display, modern vehicles comprise, for example, a multiplicity of driver assistance systems, the information from which must be displayed in the vehicle. Vehicles also often comprise a navigation system. Such a navigation system can be used to display digital geographical road maps with a route and possibly varied additional information. Finally, modern vehicles often comprise communication and multimedia applications, including a mobile telephone interface and devices for playing back music and voice. The option of displaying information must also exist for these applications in the vehicle.

To be able to flexibly display the varied information, use is made of, for example, freely programmable displays which often also undertake the playback of conventional mechanical instruments. DE 10 2006 032 118 A1 describes, for example, a combination instrument for a motor vehicle comprising a display which can be used to variably display the speed of the motor vehicle, the rotational speed of the engine of the motor vehicle, the temperature of the engine of the motor vehicle, the tank filling level and/or the time. It is also possible to display information from a navigation system, a telephone, a music system, an infotainment system and/or an air-conditioning system.

In addition to the combination instrument, a display device is often arranged above the center console of the vehicle and can be used to display further information. This display device is used, in particular, as a multifunction display and to present a geographical map of a navigation system. Such a multifunction display is described in DE 199 41 956 A1, for example.

LIST OF REFERENCE SYMBOLS

1 Vehicle
2 Display area
3 Operating device
4 Display device
5 Actuating object, user's fingertip
6 Touch-sensitive surface
7 Control device
8 Data bus
9 Timer
10 Graphical object
11 Geographical area
12 Geographical area
13 Graphical object
14 Graphical object
15 Graphical object
16 Buttons
17 Devices of the vehicle 1
18 Proximity sensor

The invention claimed is:

1. A method for providing an operating device in a vehicle, the method comprising:
   generating, in a control device, graphics data, which control a display area in such a manner that a graphical object containing a presentation of at least part of the Earths surface is displayed;
   subdividing the presentation of the displayed part of the Earth's surface into geographical areas in different time zones;
   detecting the position of an actuating object in front of or on the display area;
   selecting and displaying, in highlighted form, a geographical area which belongs to a single time zone depending on the detected position of the actuating object relative to the displayed geographical areas in different time zones in the presentation of the graphical object; and
   associating the time zone of the selected geographical area with at least one timer of the vehicle,
   wherein a geographical area is selected and presented in highlighted form in response to the actuating object touching a touch-sensitive surface of the display area in the region in which the geographical area is displayed. and the selected geographical area is not vet associated with the timer as long as the actuating object is touching the touch-sensitive surface of the display area.

2. The method of claim 1, wherein the control device generates graphics data, which control the display area in such a manner that a further graphical object is displayed, which further graphical object identifies some of the countries and/or cities and/or regions included in the selected geographical area.

3. The method of claim 1, wherein the control device generates graphics data which control the display area such that a further graphical object is displayed, which further graphical object displays the current time in the selected geographical area.

4. The method of claim 1, wherein the control device generates graphics data which control the display area such that a further graphical object is displayed, which further graphical object displays the relative time difference between the selected geographical area and an area in a particular time zone.

5. The method of claim 4, wherein in response to the actuating object touching the touch sensitive surface, the contents of at least one further graphical object are changed in such a manner that the current time and/or the relative time difference of the selected geographical area is/are displayed.

6. The method of claim 1, wherein a geographical area is selected and presented in highlighted from if the actuating object touches a touch-sensitive surface of the display area in the region in which the geographical area is displayed, and in that the selected geographical area is associated with the timer if the touching of the actuating object is removed from the touch-sensitive surface of the display area.

7. An operating device for a vehicle, the operating device comprising:
 a display area for graphically presenting information in the vehicle;
 a control device which generates graphics data for a graphical object presentation on the display area with a presentation of at least part of the Earth's surface, the presentation of the displayed part of the Earth's surface being subdivided into geographical areas in different time zones; and
 an input device coupled to the control device and can be used to detect the position of an actuating object in front of or on the display area,
 wherein, depending on the detected position of the actuating object relative to the displayed geographical areas in different time zones, the control device generates graphics data which control the display area. in such a manner that a selected geographical area which belongs to a single time zone is displayed in highlighted form, and
 wherein the control device generates a control signal for a timer of the vehicle, which control signal is associated with the time zone of the selected geographical area,
 wherein a geographical area is selected and presented in highlighted form in response to the actuating object touching a touch-sensitive surface of the display area in the region in which the geographical area is displayed, and the control signal is not vet generated associated with the time zone as long as the actuating object is touching the touch-sensitive surface of the display area.

8. A vehicle having an operating device as claimed in claim 7.

* * * * *